United States Patent
Rezanezhad Gatabi

(10) Patent No.: US 10,209,110 B2
(45) Date of Patent: Feb. 19, 2019

(54) ULTRASONIC SENSOR FOR DISPLACEMENT, VIBRATION, LINEAR AND ROTATIONAL SPEED AND POSITION, AND FLUID FLOW MEASUREMENT

(71) Applicant: Javad Rezanezhad Gatabi, San Marcos, TX (US)

(72) Inventor: Javad Rezanezhad Gatabi, San Marcos, TX (US)

(73) Assignee: Javad Rezanezhad Gatabi, San Marcos, TX (US)

( * ) Notice: Subject to any disclaimer, the term of this patent is extended or adjusted under 35 U.S.C. 154(b) by 151 days.

(21) Appl. No.: 15/040,958

(22) Filed: Feb. 10, 2016

(65) Prior Publication Data

US 2016/0231153 A1    Aug. 11, 2016

Related U.S. Application Data

(60) Provisional application No. 62/114,061, filed on Feb. 10, 2015.

(51) Int. Cl.
*G01F 1/66* (2006.01)

(52) U.S. Cl.
CPC .............. *G01F 1/663* (2013.01); *G01F 1/667* (2013.01)

(58) Field of Classification Search
None
See application file for complete search history.

(56) References Cited

U.S. PATENT DOCUMENTS

| | | | | |
|---|---|---|---|---|
| 4,452,090 A * | 6/1984 | Kou | ........................ | G01F 1/668 73/861.28 |
| 5,573,041 A * | 11/1996 | Skell | ...................... | B67D 1/124 141/1 |
| 6,647,804 B1 * | 11/2003 | Deines | .................... | G01F 1/663 73/1.16 |
| 2004/0113522 A1* | 6/2004 | Nagahara | ................ | G01F 1/662 310/326 |

OTHER PUBLICATIONS

Garcia-Rodriguez, M., et al. "Low Cost Matching Network for Ultrasonic Transducers." Physics Procedia, vol. 3, No. 1, 2010, pp. 1025-1031., doi:10.1016/j.phpro.2010.01.132.*

(Continued)

*Primary Examiner* — Joseph Schoenholtz

(57) ABSTRACT

This application discloses a new ultrasonic measurement technique to measure the velocity and displacement of the objects. Minimizing the effect of amplitude modulation from ultrasonic phase and amplitude extraction system, is a novel approach to significantly improve the accuracy and precision of the measurements. The possibility of the measurements using a single ultrasonic transducer functioning as a transmitter and receiver in continuous measurement, may be a significant advantage of this measurement technique over conventional methods. The ability of doing measurement on the objects much smaller than the wave wavelength may be an advantage of this innovative measurement technique comparing with contemporary ultrasonic measurement systems that are limited by the wavelength of the sound. Applications for this novel measurement system are also disclosed in this application.

21 Claims, 10 Drawing Sheets

(56) References Cited

OTHER PUBLICATIONS

Chemloul, N. Sad, et al. "Simultaneous Measurements of the Solid Particles Velocity and Concentration Profiles in Two Phase Flow by Pulsed Ultrasonic Doppler Velocimetry." Journal of the Brazilian Society of Mechanical Sciences and Engineering, vol. 31, No. 4, 2009, pp. 333-343., doi:10.1590/s1678-58782009000400008.*
S. Okabe and S. Tanaka, "Measurement of shaft vibration using ultrasonic sensor," SICE 2003 Annual Conference (IEEE Cat. No. 03TH8734), Fukui, Japan, 2003, pp. 1155-1158 vol. 2.*
Blessing, G. V., and D. G. Eitzen. "Ultrasonic Sensor for Measuring Surface Roughness." Surface Measurement and Characterization, 1989, doi:10.1117/12.949180.*

* cited by examiner

ULTRASONIC SENSOR FOR DISPLACEMENT, VIBRATION, LINEAR AND ROTATIONAL SPEED AND POSITION, AND FLUID FLOW MEASUREMENT

CROSS-REFERENCE TO RELATED APPLICATIONS

This application claims the benefits of U.S. provisional application No. 62/114,061, filed on Feb. 10, 2015.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Ultrasonic sensors are widely used in distance, level, velocity, vibration, and flow measurement applications. Ultrasonic measurements may be based on three fundamental measurement techniques or a combination or modification of them. "Transit time" technique is based on the travel time of the sound wave. "Phase shift" measurement is based on the phase difference between transmitted wave and the received wave. "Doppler measurement" is based on the frequency shift of the received wave due to Doppler Effect. Using the conventional ultrasonic measurement techniques for high accuracy, rapid, and continuous displacement and velocity measurement of a surface requires the use of high-frequency, high-accuracy ultrasonic transducers. The cost of the fabricated sensor may be a barrier preventing the use of the ultrasonic sensors in many low-price applications.

BRIEF SUMMARY OF THE INVENTION

In this invention, a new ultrasonic measurement technique is employed to build a measurement tool that can measure the velocity and displacement of the objects. In the said measurement technique, the behavior of the ultrasonic sensor in close proximity of the surface of an object is considered. In this novel measurement technique, it is possible to continuously measure the velocity and displacement of the under test surface at the same time and extract the amplitude, phase, and Doppler data. Minimizing the effect of amplitude modulation from ultrasonic phase and amplitude extraction system is a novel approach to significantly improve the accuracy and precision of the measurements. This measurement technique provides a new tool for high accuracy/precision and rapid velocity and displacement measurement using a cost-effective hardware. This hardware can be used in different applications such as: Tachometers and Incremental Encoders (devices to measure the rotational displacement and speed), Absolute encoders (Devices used to measure the rotational position), Dial indicators and linear encoders (Used to measure the linear movements), Vibration meters (Used to measure the vibration of the under test surface), Roughness meter, music tuner (measuring the vibration of music instruments or their strings for tuning purposes), and flowmeter. The ability of doing measurement on the objects much smaller than the wave wavelength is an advantage of this innovative measurement technique comparing with contemporary ultrasonic measurement systems that are limited by the wavelength of the sound. Another significant advantage of this measurement technique over conventional measurements may be the possibility of the measurements by using a single ultrasonic transducer. In this novel measurement technique, a single ultrasonic transducer can do continuous Doppler, Phase, and Amplitude measurements. This single transducer device has less alignment issues comparing with dual transducer techniques.

DETAILED DESCRIPTION OF THE INVENTION

Figure 1:
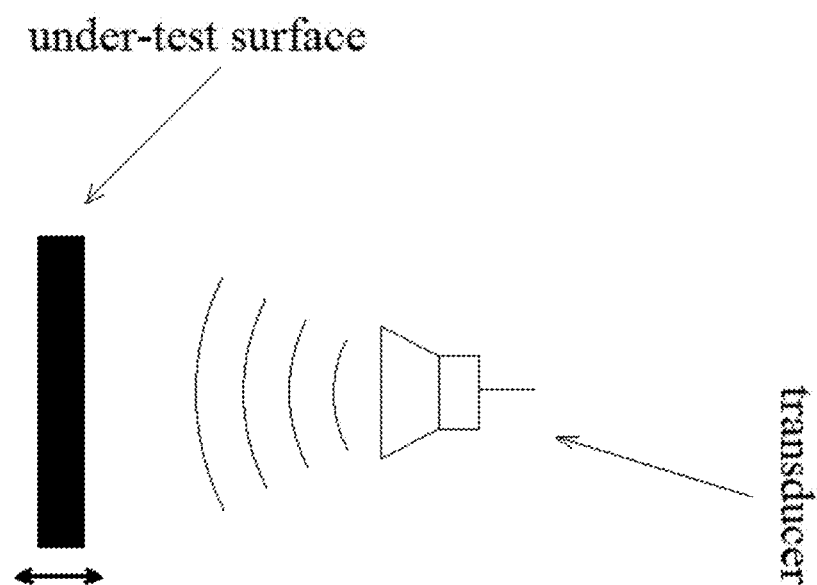
FIG. 1 illustrates a single transducer that is positioned in front of the under-test target; wherein the said transducer sends a wave that is being reflected back from the under test target, wherein a portion of the said wave returns back to the said transducer and being received by the said transducer.

In basic form, this invention comprises a sonic (preferably ultrasonic) transducer functioning as a transmitter and also a receiver. The use of a single transducer functioning as a transmitter and also a receiver at the same time for continuous measurement, is a novel technique providing a cost-effective sensor with easier alignment and better measurement performance. The transducer is positioned in front of the under-test target, FIG. 1; wherein the said transducer sends a wave that is being reflected back from an under test target, wherein a portion of the said wave returns back to the said transducer and being received by the said transducer (received signal). In the preferred embodiment of the invention, an ultrasonic wave with the preferred frequency between 20 KHz to 5 MHz is applied. But, it is also possible to do the measurements using both sonic as well as non-sonic waves with different frequencies. In order to improve the stability of the transducer, a DC signal can be added to the ac wave.

As the under-test surface has a mechanical movement, the received signal may have three possible differences compared to the transmitted wave: The amplitude of the received signal is a function of time and distance between the under-test surface and transducers. The frequency of the received signal is a function of the time and the speed of the under-test surface due to the Doppler Effect. The phase of the received signal (with respect to the phase of the transmitted wave) is a function of the time, Surface speed, and the distance between the under-test surface and the transducers. An analog circuit or a digital circuit optionally in combination with a software can be employed to extract the distance (or displacement) and velocity data from the transmitted and received signal. The velocity and the displacement function of the target surface can be employed to measure the rotational speed, rotational position, linear speed, linear position, surface roughness, surface topography, fluid flow, and vibration.

Figure 2:
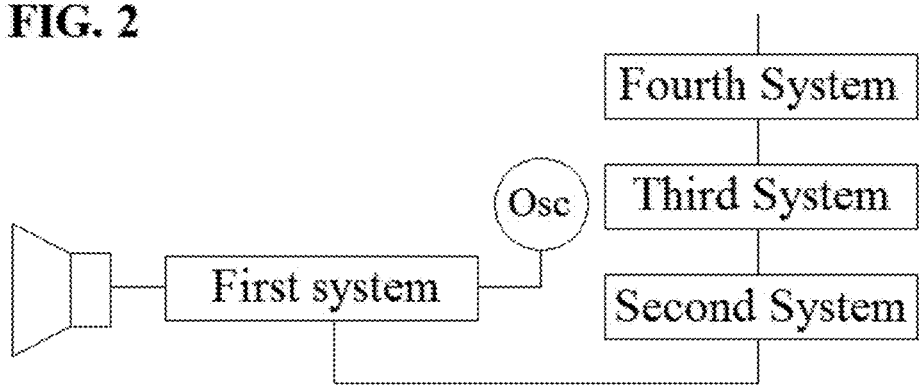
FIG. 2 illustrates the preferred embodiment for the circuit used to extract the velocity and displacement data from the transmitted and received signals for a single transducer sensor.

As shown in FIG. 2, an oscillator is generating a signal for the said transducer, wherein the said oscillator can generate an ac signal of any form (Sinusoidal, rectangular, triangular, saw-tooth, burst, etc.). There is no significant advantage of using a complex waveform, so in the preferred embodiment for this invention, a sine-wave signal, is used. The said oscillator is capable of adding a dc offset to the said ac signal or subtracting a dc offset from the said ac signal, wherein the said oscillator may have an amplifier for amplification of the said oscillator signal, wherein the said oscillator may have an impedance matching circuit for matching the impedance between any two components of the said oscillator, amplifier, or transducer.

Figure 3:
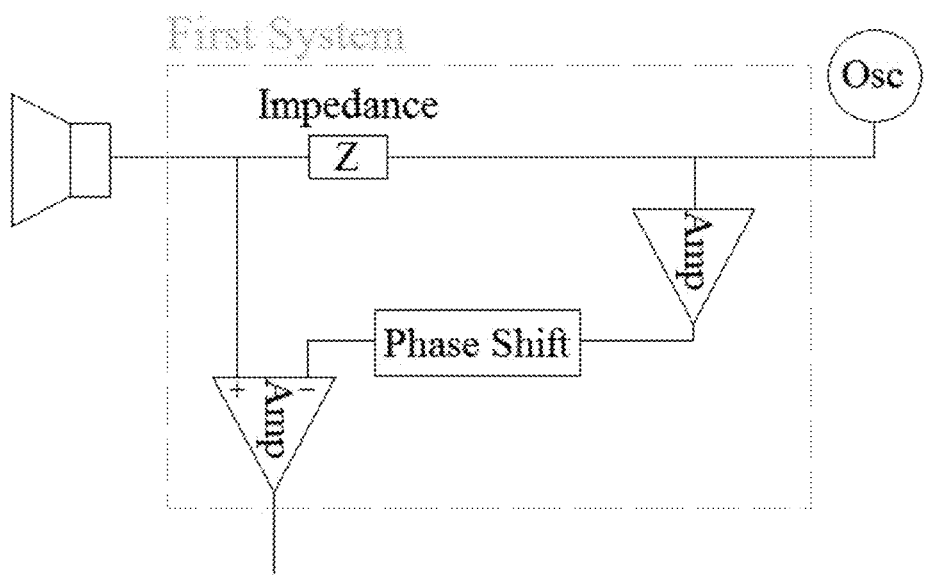
FIG. 3 shows the preferred embodiment for the first electrical or electronic and/or software system that is employed to extract the said received signal from the said transducer signal.

As shown in FIG. 2, a first electrical or electronic and/or software system is employed to extract the said received signal from the transducer signal, wherein the said first system can be built in different ways. In a preferred embodiment of the said first system, as shown in FIG. 3, the said oscillator is connected to the said transducer using an impedance, wherein the signal of the said transducer is subtracted from the said oscillator signal after amplitude and/or phase manipulation on the said oscillator signal. It is also important to mention that the said oscillator can be connected to the said transducer using a series impedance or a parallel impedance or both series and parallel impedances. The signal of the said transducer can also be added to, or is subtracted from the said oscillator signal after amplitude and/or phase manipulation on the said transducer signal and/or the said oscillator signal.

The received signal after extraction from the said transducer signal and an optional amplification, is a time dependent function. When the sensor is close enough to the target surface, the amplitude of the said received signal may be significantly affected by the distance between the transducers and the target. The phase, frequency, or amplitude of the received signal hold position and velocity data. To extract the phase or frequency from the received signal, as shown in FIG. 2, a second electrical or electronic and/or software system is employed to eliminate the amplitude modulation from the received signal. Removing the time dependent amplitude of the said signal is a novel technique employed in this invention. Extracting the phase or Doppler data while the amplitude of the said signal is independent from the position or speed of the under test surface, gives more accurate and more precise measurement comparing with conventional measurement techniques. Removing the amplitude of the modulated signal is not absolutely required to extract the phase and frequency data. But, in the preferred embodiment of the invention, it is implemented because it improves the measurement. The said second system can be built in different ways, wherein in a preferred embodiment for the said second system, the following three methods or a combination of them can be employed, the said received signal is converted to a square waveform and then converted to a sinusoidal waveform; or the said received signal is amplified using a high gain amplifier and the output of the said amplifier is filtered; or the peak of the said received signal is determined using a peak detector circuit then the said received signal is divided to the peak of the signal;

As shown in FIG. 2, a third electrical or electronic and/or software system is used to extract the phase and/or frequency data of the said received signal, wherein the said third system can be built in different ways, wherein in a preferred embodiment of the said third system, the following five methods or a combination of them can be employed, the phase and/or frequency data of the said receiver signal are extracted by multiplying (mixing) the said received signal with a known signal (preferred to be a known sinusoidal signal) and applying a low-pass filter; or the phase and/or frequency data of the said received signal are extracted by multiplying (mixing) the said received signal with a known signal (preferred to be a known sinusoidal signal) and applying a high-pass filter and comparator or a subtractor; or the phase and/or frequency data of the said received signal are extracted by employing a frequency-domain circuit or an algorithm including but not limited to: Fourier transform algorithm in any form including but not limited to: Discrete Fourier Transform (DFT) or Fast Fourier Transform (FFT); harmonic product spectrum, cepstral analysis, maximum likelihood; or a combination of the said Frequency-domain circuits or algorithms; or the phase and/or frequency data of the said received signal are extracted by employing a time-domain circuit or algorithm including but not limited to: Zero-crossing, average magnitude difference function (AMDF), Average Squared Mean Difference Function (ASMDF), autocorrelation; or a combination of the said time-domain circuits or algorithms; or the phase and/or frequency data of the said received signal are extracted by employing any type of frequency demodulators or phase demodulators including but not limited to: frequency discriminator, phase shift discriminator, slope detector, ratio detector, Foster-Seeley detector, zero-crossing detector, Phase-Locked Loops, quadrature, and coincidence techniques;

As shown in FIG. 2, a fourth electrical or electronic and/or software system is employed to translate the said extracted phase, frequency or amplitude data to distance or velocity, or both. The position or velocity data can also be extracted from the amplitude of the modulated signal. A fifth system comprising an amplitude demodulator can be employed for this purpose.

Figure 4:
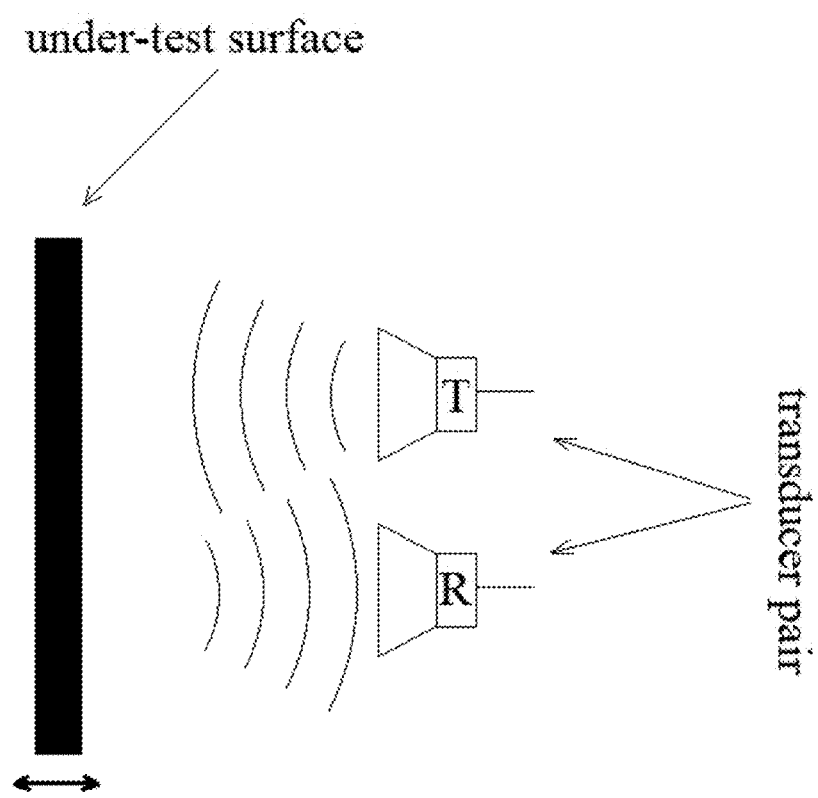
FIG. 4 illustrates a pair of transducers wherein a first transducer is functioning as a transmitter and a second transducer is functioning as a receiver, wherein the said transmitter sends a wave that is being reflected back from an under test target, wherein a portion of the said wave returns back to the said receiver and being received by the said receiver
Figure 5:
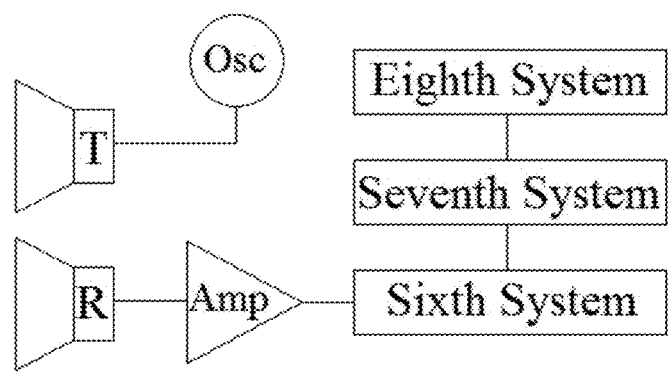
FIG. 5 illustrates the preferred embodiment for the circuit used to extract the velocity and displacement data from the transmitted and received signals for a dual transducer sensor.

The sensor can also be implemented using a pair of transducers as shown in FIG. 4. The first transducer is functioning as a transmitter and the second transducer is functioning as a receiver, wherein the said transmitter sends a wave that is being reflected back from an under test target, wherein a portion of the said wave returns back to the said receiver and being received by the said receiver (received signal). As shown in FIG. 5, the received signal after an optional amplification, is applied to a sixth system to eliminate the amplitude modulation. The said sixth system is equivalent to the second system as explained above. The signal is then applied to a seventh system to extract the phase and/or frequency data. The said seventh system is equivalent to the said third system. The signal is then applied to an eighth system to extract the distance and/or velocity data. The said eighth system is equivalent to the said fourth system. The position or velocity data can also be extracted from the amplitude of the said modulated signal. A ninth system comprising an amplitude demodulator can be employed for this purpose.

Figure 6:
FIG. 6 illustrates a pair of transducers in a non-reflecting orientation. The first transducer is functioning as a transmitter and the second transducer functioning as a receiver, wherein the said transmitter sends a wave, a portion of which travels to the said receiver and is being received by the said receiver

The said sensor can also be implemented using a pair of transducers in non-reflecting orientation as shown in FIG. 6. The first transducer is functioning as a transmitter and the second transducer is functioning as a receiver, wherein the said transmitter sends a wave, a portion of which travels to the said receiver and is being received by the said receiver (received signal). When one of the transducers is moving with respect to the other transducer, the explained system as shown in FIG. 5 can also be used to extract the distance and/or velocity data.

Figure 7A:
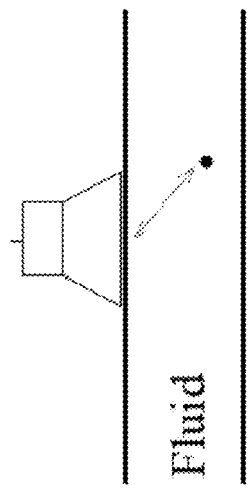
FIG. 7A shows that a single transducer sensor can be employed to measure the velocity of particles in the fluid. The sensor embodiment comprising two transducers in reflecting orientation as shown in FIG. 7B which can also be employed to measure the velocity of particles in the fluid. The sensor embodiment comprising two transducers in non-reflecting orientation as shown in FIG. 7C which can also be employed to measure the velocity of the fluid. It is also possible to improve the flow meter using two pair of transducers in differential mode as shown in FIG. 7D.
Figure 7B:
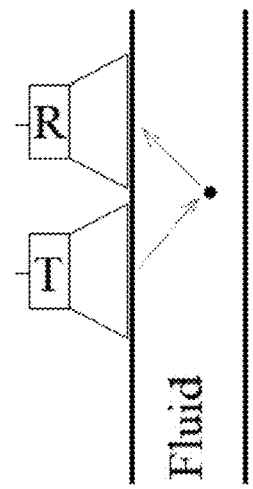
Figure 7C:
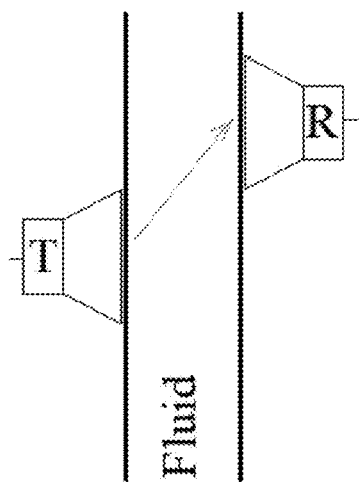
Figure 7D:
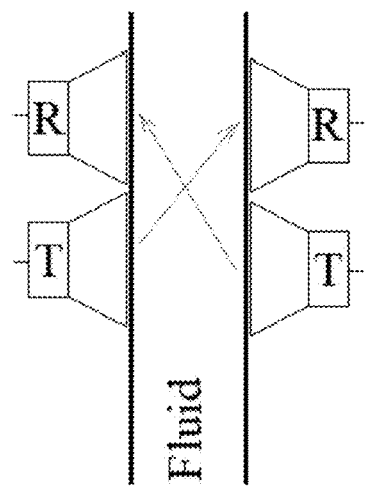

In some example embodiments, the sensor can be used as a gas, liquid, or mass flowmeter. As shown in FIG. 7A, a single transducer sensor can be employed to measure the velocity of particles in the fluid. The sensor embodiment comprises two transducers in reflecting orientation as shown in FIG. 7B which can also be employed to measure the velocity of particles in the fluid. The sensor embodiment comprises two transducers in non-reflecting orientation as shown in FIG. 7C which can also be employed to measure the velocity of the fluid. In this orientation, the ultrasonic wave path makes an angle from 0 to 180 degree with the fluid flow path. The velocity of the fluid affects the amplitude and/or phase and/or frequency of the received signal. It is also possible to improve the performance of the flow meter using two pairs of transducers in differential mode as shown in FIG. 7D.

In some example embodiments, the displacement function and the velocity function, extracted from the signals can be used to measure the vibration of the under test surface. Another example application for this measurement tool is an ultrasonic dial test indicator (a device to precisely measure the distance and displacements).

Figure 8A:
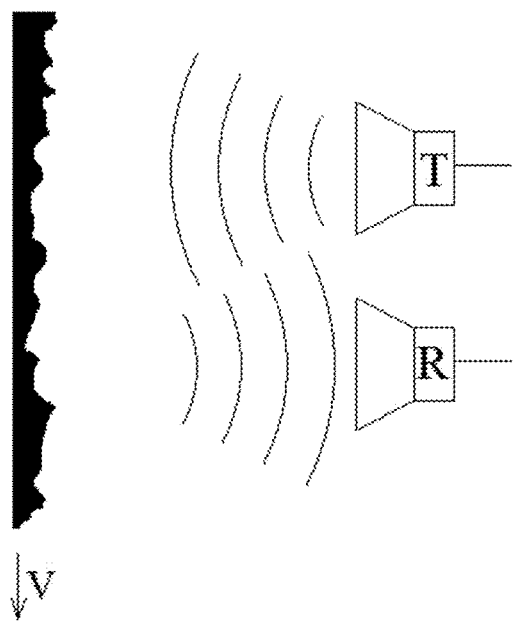
FIG. 8 shows that by moving the target surface in the horizontal plane, the sensor can calculate the surface roughness function (surface topography function) from the velocity and/or displacement function. Horizontal movement can be done by linear movement of the surface (FIG. 8A) or by rotational movement (FIG. 8B).
Figure 8B:
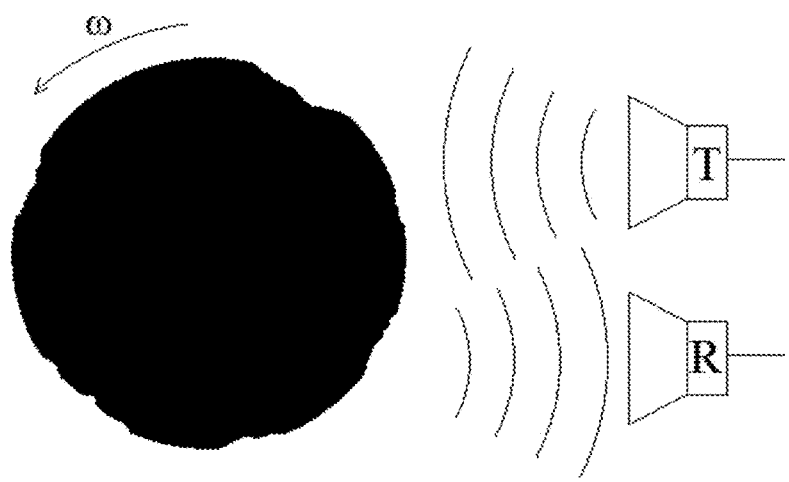

In some example embodiments, moving the target surface in the horizontal plane, the sensor can calculate the surface roughness function from the velocity and or displacement function. Horizontal movement can be done by linear movement of the surface (FIG. 8A) and or by rotational movement (FIG. 8B). Continuous velocity and/or displacement measurement from a rotational part results a surface topography function that is repeated by rotation of the part. Applying a pitch detection algorithm on this function gives the rotational speed of the rotating part. So, the sensor can work as a tachometer. A rotational part with a known surface topography can also be used to measure the rotational speed or rotational position. In this case the sensor can be used as an absolute or incremental encoder.

Figure 9A:
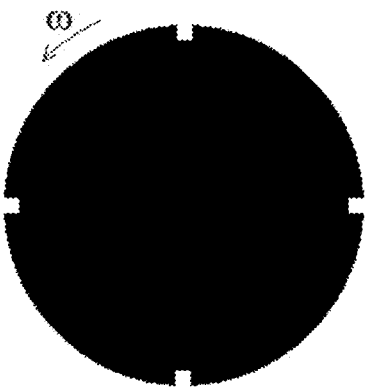
FIG. 9A illustrates the sensor measurement on a pre-designed pattern. A single transducer or a transmitter-receiver pair continuously measures the target surface and the measurement from this sensor can be used for accurate position determination or speed measurement.
Figure 9B:
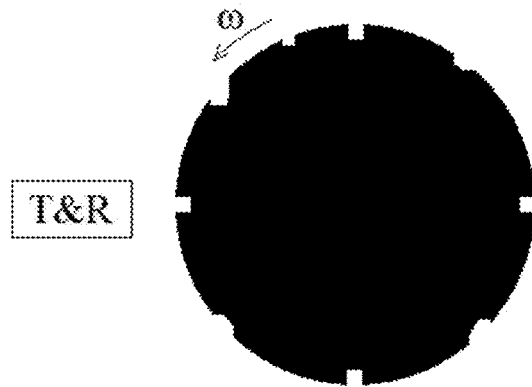
FIG. 9B illustrates a multi-sensor orientation to improve the accuracy and/or precision of the measurement.

In some example embodiments, a pre-designed pattern, as shown in FIG. 9A, like a disk with a desired surface topography (with any arbitrary or custom designed surface function) can be used. A single transducer or a transmitter-receiver pair continuously measures the target surface and the measurement from this sensor can be used for accurate position determination or speed measurement. The measurement accuracy and/or precision can be improved using more than one sensor as shown in FIG. 9B. The simultaneous measurement from more than one sensor can be used by many algorithms to provide a more reliable calculation of rotational position and/or speed.

Figure 10A:
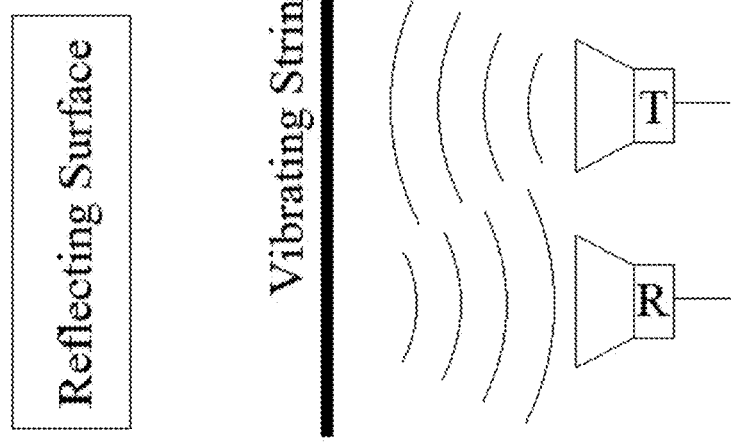
FIG. 10A shows how an auxiliary reflecting surface can be used to measure the displacement or vibration of an object with small dimensions.
Figure 10B:
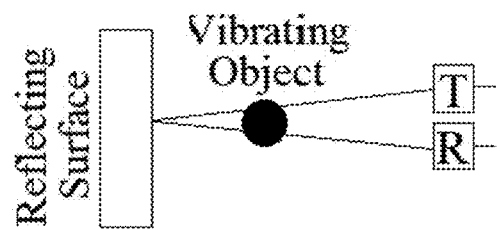
FIG. 10B, FIG. 10C, and FIG. 10D show different orientations of sensors, under test object, and reflecting surface.
Figure 10C:
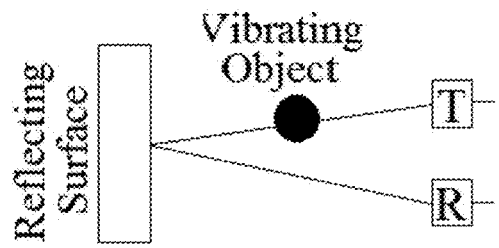
Figure 10D:
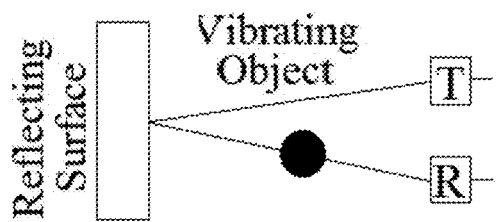

It is also possible to measure the vibration (either axial or horizontal vibration) of a small object or a thin string. Because the phase and/or the frequency and/or the amplitude of the received signal is a function of Doppler Effect and also parametric effects (the effect of the pressure variation of the medium and the effect of the particle velocity of the medium), the sensor is also able to do the measurements on the objects much smaller than the wavelength of the transmitted ultrasonic wave (wavelength of the said oscillator). While conventional measurements are limited by the diffraction, in this novel measurement technique, the sensor measures the vibration (or other displacements) of a very small object. In this invention, the sensor measures the wave generated in a medium instead of directly measuring the under test object. Measuring the vibration of a thin string for tuning the music instruments is an example of this application. As Shown in FIG. 10A, an auxiliary reflecting surface in employed to measure the vibration of the string. It is important to mention that different orientations of the under test object, sensors and reflecting surface can be used in this measurement. FIG. 10B shows an example embodiment of the ultrasonic wave travel path from the transmitter to the receiver. In this orientation, the wave has two intersections with the proximity of the vibrating object. In the orientation shown in FIG. 10C and FIG. 10D, the wave only passes from the proximity of the under test object one time that can be the incident (FIG. 10C) or reflected (FIG. 10D) path. If the string (or any other under test object) is thick enough, the reflecting wall may not be required. The sensor in non-reflecting orientation can also do the vibration measurement on small objects.

In all embodiments explained in this invention, several transmitters and one receiver or one transmitter and several receivers can be implemented. In this novel measurement method, the constructive and destructive interference of the ultrasonic wave can improve the measurement. All measurements explained in this invention can be done in the air or any liquid or solid (or any mixture of them) medium.

The invention claimed is:

1. A displacement and/or velocity measurement sensor, wherein said sensor comprises:
   an acoustic transducer functioning as a transmitter and also a receiver simultaneously, wherein said acoustic transducer sends a wave that is being reflected back from an under test target, wherein a portion of said wave returns back to said acoustic transducer and being received by said acoustic transducer as a received signal,
   an oscillator for generating an oscillator signal for said acoustic transducer,
   a first system to extract said received signal from a signal on acoustic transducer (transducer signal),
   a second system to eliminate the modulated amplitude from the received signal, resulting in a normalized amplitude signal,
   a third system to extract a phase and/or frequency data of said normalized amplitude signal, resulting in a phase/frequency signal,
   a fourth system to translate said extracted phase/frequency signal to distance or velocity, or both (distance/velocity signal).

2. The sensor of claim 1, wherein said oscillator generates the oscillator signal in a form of a sinusoidal signal or a summation of multiple sinusoidal signals, wherein said oscillator is capable of adding a dc offset to said oscillator signal or subtracting the dc offset from said oscillator signal, and wherein said oscillator, the first system and the acoustic transducer have connections or combinations there of comprising:
   the oscillator is connected to the first system and/or the first system is connected to the acoustic transducer; or
   the oscillator signal is amplified and/or the transducer signal is amplified; or
   an impedance matching system is placed between the oscillator and the first system, and/or an impedance matching system is placed between the first system and the acoustic transducer.

3. The sensor of claim 1, wherein the first system comprises: a series impedance or a parallel impedance or both series and parallel impedances placed between the oscillator and the acoustic transducer, wherein said transducer signal is added to, or is subtracted from said oscillator signal after amplitude and/or phase manipulation on said transducer signal and/or said oscillator signal.

4. The sensor of claim 1, wherein said second system comprises:
   a device to convert the received signal to a square waveform and convert the square waveform to a sinusoidal signal; or
   a device to amplify the received signal and filter the amplified signal; or
   a device to determine a peak of the received signal and divide the received signal to the peak value.

5. The sensor of claim 1, wherein said third system comprises:
   a first device that multiplies the normalized amplitude signal into a known sinusoidal signal or a summation of multiple known sinusoidal signals and applies a low-pass filter; or
   a second device applying Fourier transform algorithm and/or Discrete Fourier Transform algorithm and/or Fast Fourier Transform algorithm and/or harmonic product spectrum algorithm and/or cepstral analysis algorithm and/or maximum likehood algorithm and or zero-crossing algorithm and/or average magnitude difference function and or average squared mean difference function and/or autocorrelation algorithm into the normalized amplitude signal; or
   a phase and/or frequency demodulator device.

6. The sensor of claim 1, wherein the sensor measures a flow of a fluid by measuring a speed of particles or any objects in said fluid.

7. The sensor of claim 1 wherein the sensor measures a vibration frequencies and/or vibration amplitude and/or vibration phase of any object in front of said acoustic transducer, wherein said sensor directly measures said any object and/or said sensor measures a displacement of a gas or liquid or solid around said object.

8. The sensor of claim 1 wherein the sensor measures a surface topography or surface roughness parameters of any object in front of said acoustic transducer in a periodic movement or linear movement or rotational movement or any combination of said movements.

9. The sensor of claim 8, wherein the sensor measures a surface topography function of a rotating part and calculates a rotational speed of said rotating part and/or calculates a rotational position of said rotating part.

10. A displacement and/or velocity measurement sensor, wherein said sensor comprises:
    two acoustic transducers, wherein a first acoustic transducer functions as a transmitter and a second acoustic transducer functions as a receiver, wherein said transmitter sends a wave that is being reflected back from an under test target, wherein a portion of said wave returns back to said receiver and being received by said receiver as a received signal,
    an oscillator for generating an oscillator signal for said first acoustic transducer,
    a sixth system to eliminate the modulated amplitude from said received signal, resulting a normalized amplitude signal,
    a seventh system to extract a phase and/or frequency data of said normalized amplitude signal, resulting in a phase/frequency signal,
    an eighth system to translate said extracted phase/frequency signal to distance or velocity, or both (distance/velocity signal).

11. The sensor of claim 10, wherein said oscillator generates the oscillator signal in a form of a sinusoidal signal or a summation of multiple sinusoidal signals, wherein said oscillator is capable of adding a dc offset to said oscillator signal or subtracting the dc offset from said oscillator signal, and a connection between the oscillator, the transmitter, the receiver, and the sixth system has one of following forms or a combination of them: The oscillator is connected to the transmitter; or
    an amplifier is placed between the oscillator and the transmitter; or
    an impedance matching system is placed between the oscillator and the transmitter; or
    the receiver is connected to the sixth system; or
    an amplifier is placed between the receiver and the sixth system; or
    an impedance matching system is placed between the receiver and the sixth system.

12. The sensor of claim 10, wherein said sixth system comprises:
    a device to convert the received signal to a square waveform and convert the square waveform to a sinusoidal signal; or
    a device to amplify the received signal and filter the amplified signal; or a device to determine a peak of the received signal and divide the received signal to the peak value.

13. The sensor of claim 10, wherein said seventh system comprises:
   a device that multiplies a normalized amplitude signal into a known sinusoidal signal or a summation of multiple known sinusoidal signals and applies a low-pass filter; or
   a second device applying the Fourier transform algorithm and/or Discrete Fourier transform algorithm and/or fast Fourier transform algorithm and/or harmonic product spectrum algorithm and/or cepstral analysis algorithm and/or maximum likehood algorithm and/or zero-crossing algorithm and/or average magnitude difference function and/or average squared mean difference function and/or autocorrelation algorithm into the normalized amplitude signal; or
   a phase and/or frequency demodulator device.

14. The sensor of claim 10, wherein the sensor measures a flow of a fluid by measuring a speed of particles or any objects in said fluid.

15. The sensor of claim 10, wherein the sensor measures vibration frequencies and/or vibration amplitude and/or vibration phase of any object in front of said acoustic transducers, wherein said sensor directly measures said any object and/or said sensor measures the displacement of a gas or liquid or solid around said any object.

16. The sensor of claim 10, wherein the sensor measures a surface topography or surface roughness parameters of any object in front of said acoustic transducers in a periodic movement or linear movement or rotational movement or any combination of said movements.

17. The sensor of claim 16, wherein the sensor measures a surface topography function of a rotating part and calculates a rotational speed of said rotating part and/or calculates a rotational position of said rotating part.

18. The sensor of claim 10, wherein said sensor works in non-reflecting mode, wherein said transmitter sends a wave that is passing from an under test target and/or is passing from a position proximate to an under test target, wherein a portion of said wave being received by said receiver (received signal).

19. The sensor of claim 18, wherein the sensor measures a flow of a fluid in a medium between said transmitter and said receiver.

20. The sensor of claim 18, wherein the sensor measures vibration frequencies and/or vibration amplitude and/or vibration phase of any object in a medium between said transmitter and said receiver, wherein the sensor directly measures said object and/or said sensor measures a displacement of a gas or liquid or solid around said object.

21. The sensor of claim 18, wherein the sensor measures a displacement and/or a relative speed of the two acoustic transducers with respect to each other.

* * * * *